(12) United States Patent
Smacinih

(10) Patent No.: US 9,131,002 B2
(45) Date of Patent: Sep. 8, 2015

(54) WEB APPLICATION MONITORING

(71) Applicant: Microsoft Corporation, Redmond, WA (US)

(72) Inventor: Mihail Smacinih, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 13/779,380

(22) Filed: Feb. 27, 2013

(65) Prior Publication Data

US 2014/0244830 A1    Aug. 28, 2014

(51) Int. Cl.
*H04L 12/26* (2006.01)
*H04L 29/08* (2006.01)

(52) U.S. Cl.
CPC ...................................... *H04L 67/22* (2013.01)

(58) Field of Classification Search
CPC ..... H04L 67/02; H04L 12/2602; H04L 67/22; H04L 67/2885; G06F 2201/875; G06F 11/3438
USPC .......................................................... 709/224
See application file for complete search history.

(56) References Cited

U.S. PATENT DOCUMENTS

| | | | |
|---|---|---|---|
| 8,020,151 B2 | 9/2011 | Allen et al. | |
| 2009/0222554 A1* | 9/2009 | Schneider | 709/224 |
| 2010/0318976 A1* | 12/2010 | Everly et al. | 717/141 |
| 2014/0143670 A1* | 5/2014 | Swaminathan et al. | 715/720 |
| 2014/0189054 A1* | 7/2014 | Snider et al. | 709/217 |

OTHER PUBLICATIONS

SJW, "XMLHttpRequest() and Google Analytics Tracking," May 2010, StackOverflow, stackoverflow.com/questions/2748754/xmlhttprequest-and-google-analytics-tracking.*
Kiciman, et al., "AjaxScope: A Platform for Remotely Monitoring the Client-Side Behavior of Web 2.0 Applications", In Proceedings of 21st ACM Symposium on Operating Systems Principles, Oct. 14, 2007, 14 pages.
Jay, An, "Now Deeply Monitor Your Web 2.0 Websites and SaaS Web Applications with AlertFox", Published on: Aug. 26, 2009, Available at: http://www.smashingapps.com/2009/08/26/now-deeply-monitor-your-web-20-websites-and-saas-web-applications-with-alertfox.html.
"Ajax View", Published on: Apr. 29, 2009, Available at: http://research.microsoft.com/en-us/projects/ajaxview/.
Kiciman, et al., "Live Monitoring: Using Adaptive Instrumentation and Analysis to Debug and Maintain Web Applications", In Proceedings of in the 11th Workshop on Hot Topics in Operating Systems, May 2007, 6 pages.
"eValid—Testing Ajax Applications", Retrieved on: Nov. 22, 2012, Available at: http://www.soft.com/eValid/Ads/TestingAJAXApps/index.phtml?status=FORM.
"Web Performance Monitor", Retrieved on: Nov. 22, 2012, Available at: http://www.iis.net/downloads/community/2007/01/web-performance-monitor.

* cited by examiner

*Primary Examiner* — Ruolei Zong
(74) *Attorney, Agent, or Firm* — Nicholas Chen; Aaron Hoff; Micky Minhas

(57) ABSTRACT

Gathering analytic information for dynamic web applications. A method includes determining that statistic information should be gathered for a particular dynamic web application. The method further includes substituting native methods in the application with custom methods configured to gather statistic information when called. The method further includes providing any statistics information gathered to an analytics engine for analysis.

20 Claims, 4 Drawing Sheets

WEB APPLICATION MONITORING

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections.

The connections allow a computing system to access services at other computing systems and to quickly and efficiently receive application data from other computing system. In recent times, this has been facilitated by the ubiquitous nature of the Internet and the existence of tools, such as web browsers, to access data repositories. Early "web browsing", or web 1.0, was based on a user requesting an HTML page which contained data that was quite static in nature. In particular, for a user to obtain dynamically changing information (such as headlines, stock quotes, current weather, etc.), the user would need to re- request the entire web page or a different web page to obtain any updated data. Obtaining analytical data for evaluating performance of a web 1.0 application involved gathering data at the page level and analyzing that data in the context of a web page.

In recent times, however, web 2.0 applications have been developed whereby data can be dynamically delivered to a web browser without requiring the web browser to fetch a new page or to re-fetch a page. Page level monitoring for web 2.0 applications results in inefficiencies and potential inaccuracies in data collected. In particular, web 2.0 applications do not need to refresh a web page to obtain dynamic information and user interaction may not result in refreshing a web page or obtaining a new page such that page level reporting does not accurately capture the functionality and performance of a web 2.0 application.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a web computing environment. The method includes acts for gathering analytic information for dynamic web applications. The method includes determining that statistic information should be gathered for a particular dynamic web application. The method further includes substituting native methods in the application with custom methods configured to gather statistic information when called. The method further includes providing any statistics information gathered to an analytics engine for analysis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein implement monitoring of dynamic web 2.0 sites on a web browser to gather statistics information that can be provided to an analytics engine for analysis and reporting. The content for these web 2.0 sites is populated using dynamic, asynchronous calls (such as Ajax calls). This can be done, in some embodiments, in a fully automated way with just one line of script (such as JavaScript) user code that is inserted into an application script. Embodiments may include functionality for indicating how many visitors are executing any Ajax call, what path a visitor has to take to execute an Ajax call, the performance and availability of any Ajax call executed on a web site, etc.

Previous solutions for application monitoring monitor applications automatically only at the page level and do not provide insight into what is going on inside the page. Thus, these solutions do not provide insight into what Ajax calls were performed on the page, which give insights on actions taken by a visitor on the page and the performance of the page on an Ajax call level.

Figure 1:
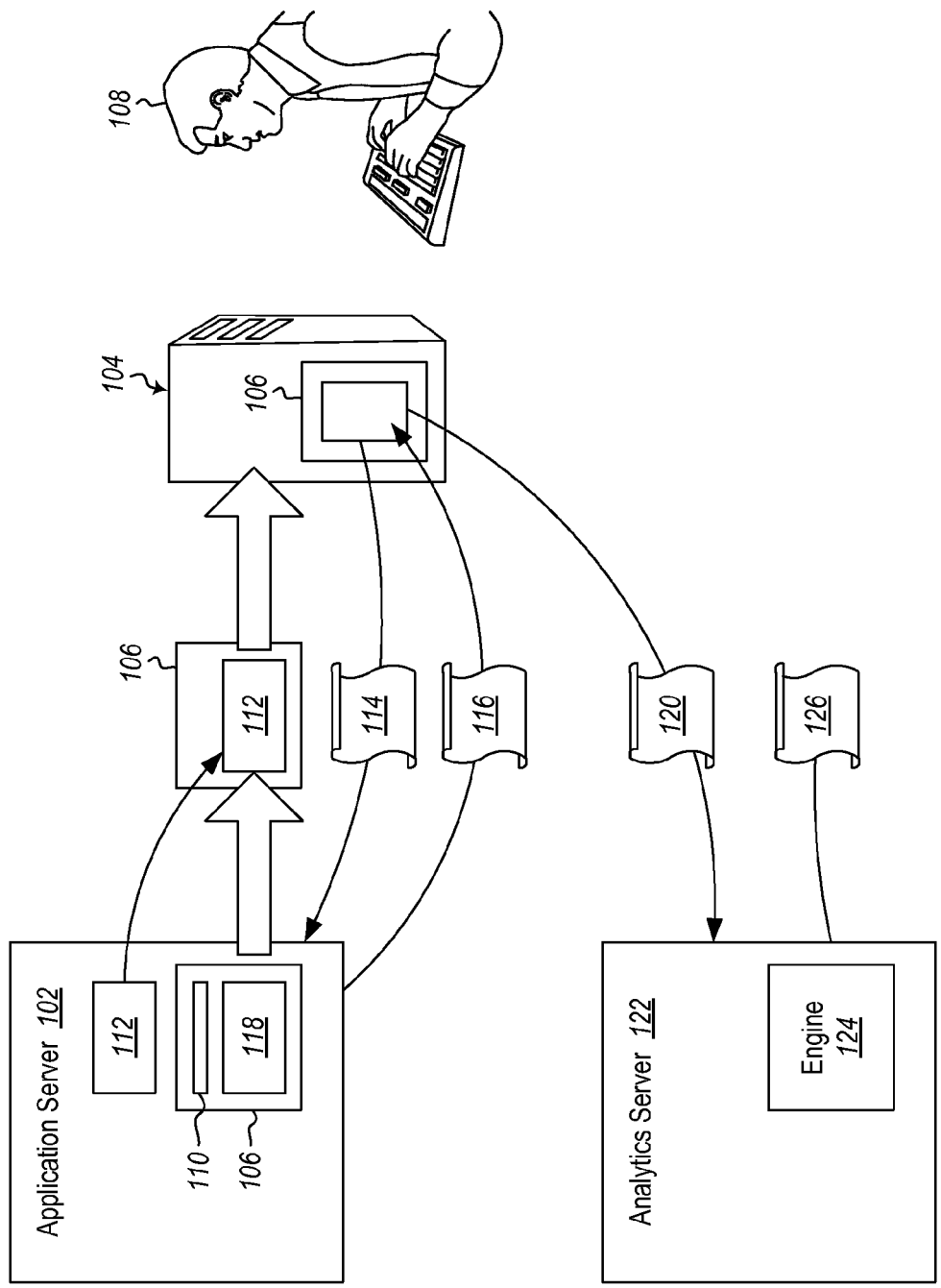
FIG. 1 illustrates various systems including an application server, a client, and an analytics server that can be used to gather statistics information and produce analytics information in dynamic web environments.

Functionality of some embodiments is now illustrated with reference to FIG. 1. In particular, FIG. 1 illustrates an application server 102. The application server 102 stores applications, such as JavaScript applications, that can be downloaded and executed by a client 104. An example application 106 is illustrated.

The client 104 may be a computing device with a web browser or other software capable of downloading applications and displaying them to a user 108. The user 108 is typically able to interact with the web browser or other software to provide input to an application 106. This can result in the application sending back dynamic calls 114 to the application server 102 to obtain dynamic content. Alternatively or additionally, the application 106 may include functionality for automatically and/or periodically sending back dynamic calls 114 without additional user interaction. Responses 116 can be returned to the client 104 to provide dynamic content to the user 108. Embodiments can include enhancements to this process to allow for additional information to be collected, analyzed and reported.

For example, as illustrated in FIG. 1, to monitor dynamic calls, on the JavaScript level in the browser, an application developer inserts a segment 110 of CSM JavaScript code, indicating that the page should be monitored, into a web application 106 on each page where there is a desire to monitor dynamic calls. Alternatively, in some embodiments, inserting a segment 110 of CSM JavaScript code can be done a single time in an application 106 by inserting the segment 110 at the master page level. In some embodiments, the segment 110 may be implemented using a single line of code.

CSM JavaScript code that has been instrumented with the segment 110 will download additional JavaScript code 112 that will intercept methods, such as XMLHttpRequest methods that are responsible for performing dynamic calls in an application 106. The interception of the following XMLHttpRequest methods can be done by redefining XMLHttpRequest method prototypes. In other words, XMLHttpRequest methods can be substituted for custom XMLHttpRequest methods that include functionality for gathering statistics information that can be used for generating analytics. As noted, this is illustrated where the additional JavaScript code 112 replaces JavaScript code 118, where JavaScript code 118 comprises standard XMLHttpRequest methods. In some embodiments, the following XMLHttpRequest methods of JavaScript code 118 are replaced by XMLHttpRequest methods of custom JavaScript code 112:

XMLHttpRequest.open( )
XMLHttpRequest.setRequestHeader( )
XMLHttpRequest.send( )
XMLHttpRequest.sendAsBinary( )
XMLHttpRequest.abort( )

XMLHttpRequest methods of custom JavaScript code 112 can be used to generate statistics regarding how much time it takes to service a dynamic call, the reliability of servicing dynamic calls, the performance of dynamic calls, the usage of dynamic calls, etc. In some embodiments, information can be generated that is able to provide a trace indicating the series of dynamic calls made that result in a user interacting with a particular site, in a particular way, at a particular time. Simply put, embodiments may be able to answer the question in the context of a user's interaction with a web site or web page and the information provided to the user "how did the user get here?" This information could be used to provide an administrator with performance and reliability information. In particular, the gathered information 120 could be provided to an analytics server 122 where it is processed by an analytics engine 124 to produce a report 126.

In some embodiments, when an Ajax request to a server is sent, the user wants to perform some actions based on the response. To determine when a dynamic call has finished, some embodiments may attach to the XMLHttpRequest.onreadystatechange event their function. The CSM handler onreadyStateChangeCallback is attached to the XMLHttpRequest.onreadystatechange event as described below.

To measure the original XMLHttpRequest.onreadystatechange callback handler, in methods XMLHttpRequest.open( ), XMLHttpRequest.send( ), XMLHttpRequest.sendAsBinary( ), callback XMLHttpRequest.onreadystatechange is redefined with the CSM wrapper.

After performing above described procedure for dynamic call interception, dynamic calls are monitored. Monitoring involves collecting data for dynamic calls. Such data may include one or more of the following:

| # | Dynamic Call Data | Description |
|---|---|---|
| 1 | Request URL | Request URL, max 1024 symbol that is passed to XmlHttpRequest object. |
| 2 | Method | HTTP Request method |
| 3 | Asynchronous | Determines whether request is asynchronous |
| 4 | Request size | Number of bytes that was sent to server with a dynamic request |
| 5 | Response size | Number of bytes that was received from the server for a dynamic request |
| 6 | Content type | HTTP Response type |
| 7 | Status | HTTP response status code. This status code allows one to understand whether or not a dynamic call was performed without errors, whether the server was available or not, whether there were any security problems on accessing server resource or not, etc. |
| 8 | Time to First byte | Time spent between the start of the send method and when content begins to load |
| 9 | Response Receiving time | Time spent between when content begins to load and when content is finished loading |
| 10 | Callback Time | Time spent in a callback function when a request is completed |
| 11 | Total Time | Total time between when a dynamic call is started and when the dynamic call is completed |
| 12 | Aborted | Determines whether a dynamic call was aborted by calling XmlHttpRequest.abort( ) method |
| 13 | Cached | Determines whether or not a dynamic call was cached |
| 14 | Visitor identifier | The unique identifier that identifies which visitor performed this dynamic call. |
| 15 | Visit identifier | The unique identifier that identifies a visit, which is a sequence of requests from a uniquely identified client that expires after a given period (e.g. 30 minutes) of user inactivity |

Further, the dynamic call collected data 120 will be sent to a CSM collector, such as the analytics server 122, via (in some embodiments) HTTP GET requests, and processed by an analytics engine 124 to create reports 126 that can be provided to a user. In some embodiments, a Big Data Analytics Engine based on Cosmos operating system can be used for the analytics server 122 and engine 124.

Figure 2:
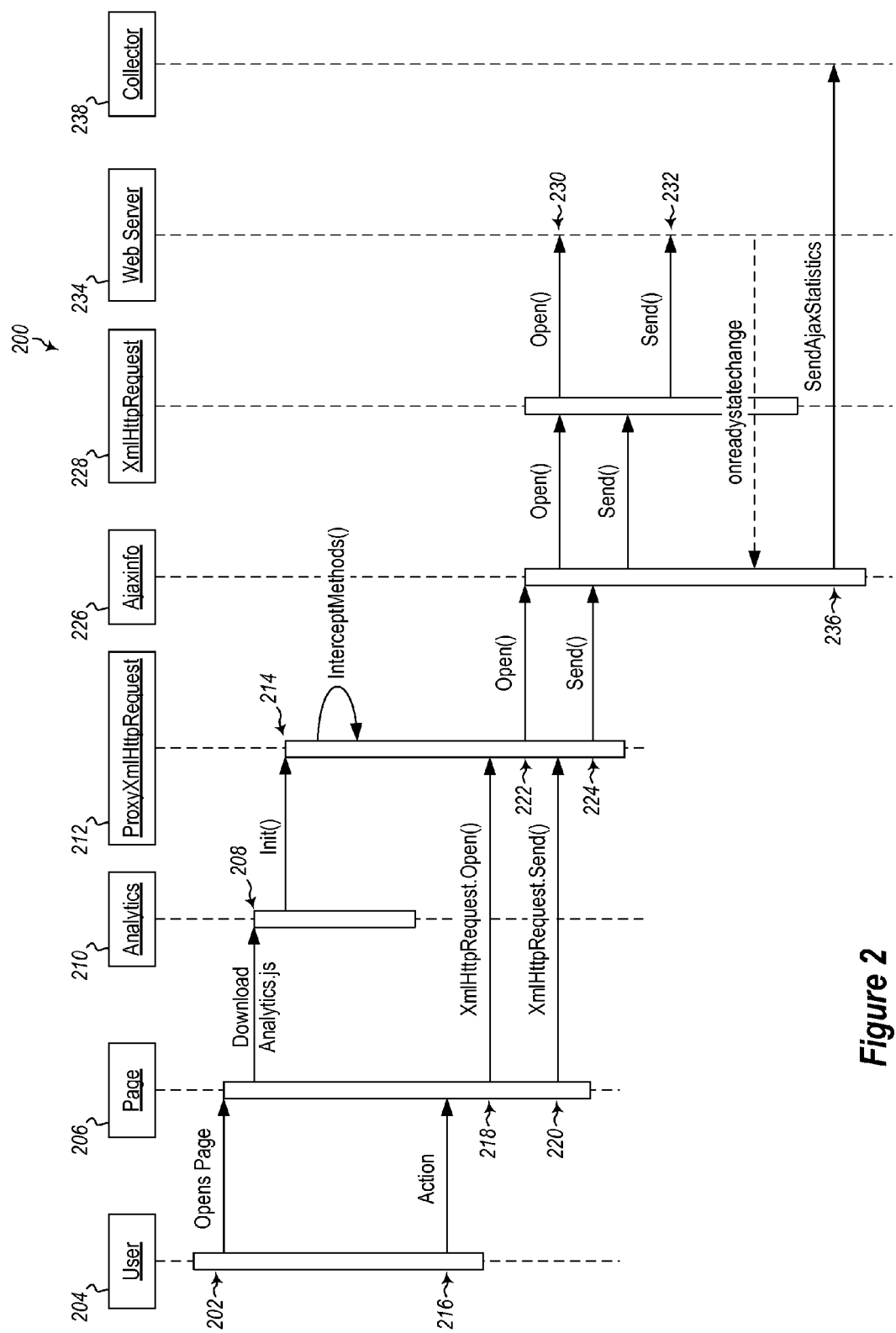
FIG. 2 illustrates messaging flow in a system for producing analytic information for dynamic web environments.

Referring now to FIG. 2, a data flow chart 200 is illustrated. The data flow chart 200 illustrates how various dynamic web page calls may be monitored. FIG. 2 illustrates at 202 that a user 204 opens a web page 206. Opening the web page invokes a dynamic application including, as illustrated at 208, downloading a JavaScript analytics bootstrapper script which causes an analytics component 210 to substitute XMLHttpRequest methods with proxy XMLHttpRequest methods 212 (as illustrated at 214) configured to intercept dynamic web calls for analysis.

As illustrate at 216, user 204 interaction with the dynamic web page 206 is illustrated. While user interaction is illustrated, it should be appreciated that in some embodiments, automated actions may cause the actions that follow to be performed. However, in the present example, user action is shown for illustrative purposes. The user action causes XMLHttpRequest.Open( ) and an XMLHttpRequest.Send( ) messages (as illustrated at 218 and 220 respectively) to be sent by the page 206. As noted, these methods were previously replaced by custom methods configured to gather statistics information for dynamic calls. Thus, as illustrated at 222 and 224 respectively, an Open( ) request and a Send( ) request are provided to a dynamic statistics gathering tool 226. However, native XMLHttpRequest 228 functionality is also preserved allowing an Open( ) request and a Send( ) request, illustrated at 230 and 232, to be sent to a web server 234. Gathered statistics information can be sent, as illustrated at 236, to a collector 238, such as analytics server 122 illustrated in FIG. 1.

Figure 3:
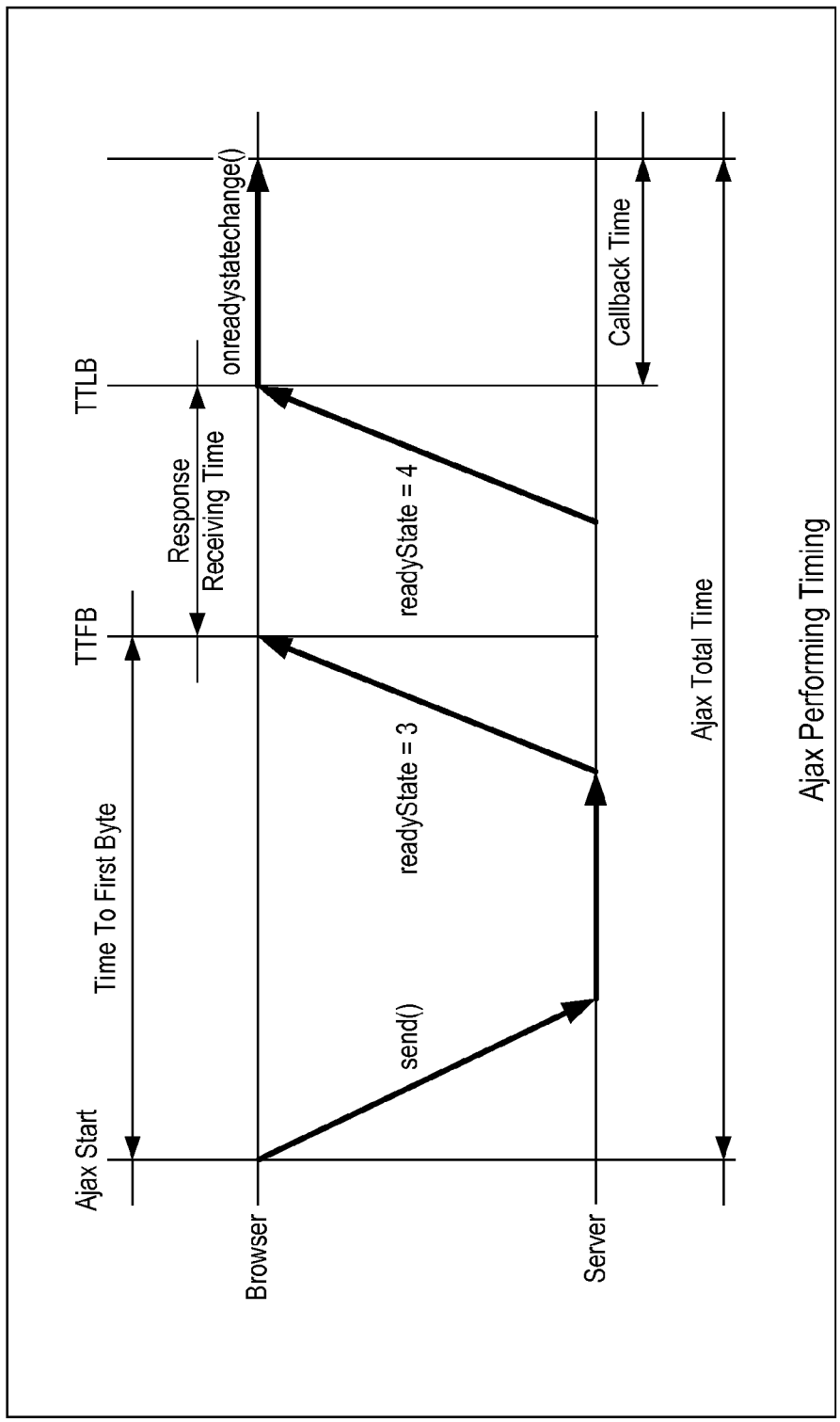
FIG. 3 illustrates a timing diagram showing dynamic web performance timing.

Referring now to FIG. 3, an example of dynamic call performance timing analytics that could be generated is illustrated.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
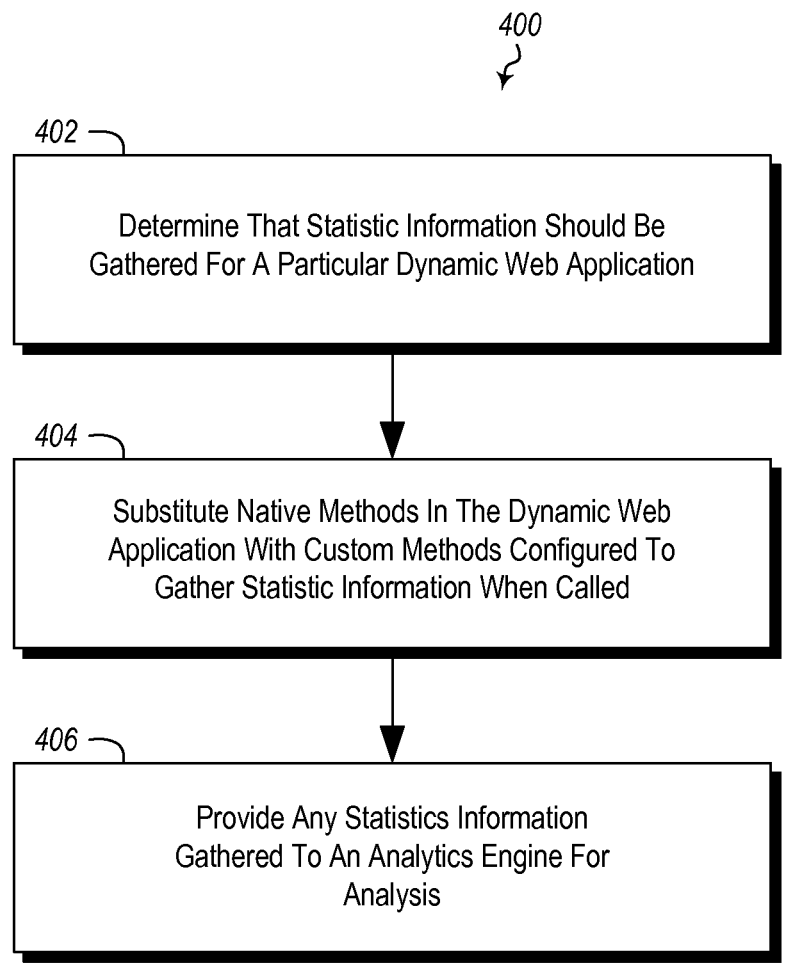
FIG. 4 illustrates a method of producing analytic information for dynamic web applications

Referring now to FIG. 4, a method 400 is illustrated. The method 400 may be practiced in a web computing environment, and includes acts for producing analytic information for dynamic web applications. The method 400 includes determining that statistic information should be gathered for a particular dynamic web application (act 402). For example, as illustrated above, the method 400 may be practiced where determining that statistics information should be gathered comprises identifying a java script call in the application indicating that statistics should be gathered. Dynamic web applications may include, for example, any Web 2.0 capable browser, so called "apps" installable on mobile devices that are capable of dynamically updating information, etc.

The method 400 further includes substituting native methods in the dynamic web application with custom methods configured to gather statistic information when called (act 404). For example, any of the following native Ajax methods:

XMLHttpRequest.open( )
    XMLHttpRequest.setRequestHeader( )
    XMLHttpRequest.send( )
    XMLHttpRequest.sendAsBinary( )
    XMLHttpRequest.abort( ) may be replaced with custom methods configured to intercept calls configured for gathering statistics information.

The method 400 further includes providing any statistics information gathered to an analytics engine for analysis (act 406).

The method 400 may be practiced where the statistics information gathered comprises at least one of: a request URL; an indication of an HTTP request method; a determination of whether or not a request is asynchronous; an indication of a number of bytes that was sent to a server with a dynamic request; an indication of a number of bytes that was received from the server with a dynamic request; an indication of an HTTP response type; an indication of an HTTP response status code; an indication of Time To First Byte (TTFB); an indication of an amount of time spent between when content begins to load and when content is finished loading; an indication of an amount of time spent in a callback function when a request is completed; an indication of an amount of total time between a dynamic call start and complete; an indication of whether a dynamic call was aborted by calling an XmlHttpRequest.abort( ) method; an indication of whether or not a dynamic call was cached; a unique identifier that identifies which visitor performed a dynamic call; a unique identifier that identifies during which visitor visit a dynamic call was performed; or call exception information.

The method 400 may further include providing analytic information to a user including one or more of performance, reliability, or usage information. In accordance with one such embodiment, the method 400 may be practiced where the analytic information is provided on a per dynamic call and not on a per page visit basis. Alternatively or additionally, the method 400 may be practiced where the analytic information provides an indication of a set of paths describing previous actions leading up to calling a particular dynamic call. Alternatively or additionally, the method 400 may be practiced where the analytic information provides an indication of the frequency with which a particular dynamic call is called. Alternatively or additionally, the method 400 may be practiced where the analytic information provides an indication of how many different users are using a particular dynamic call. Alternatively or additionally, the method 400 may be practiced where the analytic information provides an indication of geographic distribution of users causing a particular dynamic call to be called.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method of producing analytic information based on monitoring dynamic calls executed at one or more pages of a dynamic web application, where the computer-implemented method is performed by one or more processors when executing executable instructions for the computer-implemented method, which comprises:
    providing for a master page of a dynamic web application a code segment indicating that one or more pages of the dynamic web application are to be monitored for dynamic calls executed by the one or more pages;
    in response to the code segment provided at the master page, downloading additional code for custom methods configured to gather statistics information based on the dynamic calls when executed at the one or more pages of the dynamic web application;
    intercepting one or more native methods responsible for performing the dynamic calls at the one or more pages of the dynamic web application;
    in response to the intercepting of the one or more native methods, substituting the native methods in the dynamic web application with the custom methods configured to gather statistics information based on the dynamic calls when executed;
    using the custom methods to gather statistics information based on one or more dynamic calls executed at the dynamic web application; and
    providing any statistics information gathered to an analytics engine for analysis.

2. The method of claim 1, wherein the statistics information gathered is gathered on a per dynamic call basis and not on a per page visit basis.

3. The method of claim 1, wherein any of the following native methods occurring in the dynamic web application are replaced with custom methods:
    XMLHttpRequest.open( )
    XMLHttpRequest.setRequestHeader( )
    XMLHttpRequest.send( )
    XMLHttpRequest.sendAsBinary( )
    XMLHttpRequest.abort( ).

4. The method of claim 1, wherein the statistics information gathered comprises at least one of:
    a request URL;
    an indication of an HTTP request method;
    a determination of whether or not a request is asynchronous;
    an indication of a number of bytes that was sent to a server with a dynamic request;
    an indication of a number of bytes that was received from the server with a dynamic request;
    an indication of an HTTP response type;
    an indication of an HTTP response status code;
    an indication of an amount of time spent between the start of a send method and when content begins to load;
    an indication of an amount of time spent between when content begins to load and when content is finished loading;
    an indication of an amount of time spent in a callback function when a request is completed;
    an indication of an amount of total time between a dynamic call start and complete;
    an indication of whether a dynamic call was aborted by calling an XmlHttpRequest.abort( )method;
    an indication of whether or not a dynamic call was cached;
    a unique identifier that identifies which visitor performed a dynamic call;
    a unique identifier that identifies during which visitor visit a dynamic call was performed; or
    call exception information.

5. The method of claim 1, further comprising providing analytic information to a user including one or more of performance, reliability, or usage information.

6. The method of claim 5, wherein the analytic information provides an indication of a set of paths describing previous actions leading up to calling a particular dynamic call.

7. The method of claim 5, wherein the analytic information provides an indication of the frequency with which a particular dynamic call is called.

8. The method of claim 5, wherein the analytic information provides an indication of how many different users are using a particular dynamic call.

9. The method of claim 5, wherein the analytic information provides an indication of geographic distribution of users causing a particular dynamic call to be called.

10. A system for producing analytic information for dynamic web applications, the system comprising:
  one or more processors; and
  one or more computer readable media, wherein the one or more computer readable media comprise computer executable instructions that when executed by at least one of the one or more processors cause the system to perform the following:
    providing for a master page of a dynamic web application a code segment indicating that one or more pages of the dynamic web application are to be monitored for dynamic calls executed by the one or more pages;
    in response to the code segment provided at the master page, downloading additional code for custom methods configured to gather statistics information based on the dynamic calls when executed at the one or more pages of the dynamic web application;
    intercepting one or more native methods responsible for performing the dynamic calls at the one or more pages of the dynamic web application;
    in response to the intercepting of the one or more native methods, substituting the native methods in the dynamic web application with the custom methods configured to gather statistics information based on the dynamic calls when executed;
    using the custom methods to gather statistics information based on one or more dynamic calls executed at the dynamic web application; and
    providing any statistics information gathered to an analytics engine for analysis.

11. The system of claim 10, wherein any of the following native methods occurring in an application are replaced with custom methods:
  XMLHttpRequest.open( )
  XMLHttpRequest.setRequestHeader( )
  XMLHttpRequest.send( )
  XMLHttpRequest.sendAsBinary( )
  XMLHttpRequest.abort( ).

12. The system of claim 10, wherein the statistics information gathered comprises at least one of:
  a request URL;
  an indication of an HTTP request method;
  a determination of whether or not a request is asynchronous;
  an indication of a number of bytes that was sent to a server with a dynamic request;
  an indication of a number of bytes that was received from the server with a dynamic request;
  an indication of an HTTP response type;
  an indication of an HTTP response status code;
  an indication of an amount of time spent between the start of a send method and when content begins to load;
  an indication of an amount of time spent between when content begins to load and when content is finished loading;
  an indication of an amount of time spent in a callback function when a request is completed;
  an indication of an amount of total time between a dynamic call start and complete;
  an indication of whether a dynamic call was aborted by calling an XmlHttpRequest.abort( )method;
  an indication of whether or not a dynamic call was cached;
  a unique identifier that identifies which visitor performed a dynamic call;
  a unique identifier that identifies during which visitor visit a dynamic call was performed; or
  call exception information.

13. The system of claim 10, further comprising computer executable instructions that when executed by at least one of the one or more processors cause the system to provide analytic information to a user including one or more of performance, reliability, or usage information.

14. The system of claim 10, wherein the statistics information gathered is gathered on a per dynamic call basis and not on a per page visit basis.

15. The system of claim 13, wherein the analytic information provides an indication of a set of path describing previous actions leading up to calling a particular dynamic call.

16. The system of claim 13, wherein the analytic information provides an indication of the frequency with which a particular dynamic call is called.

17. The system of claim 13, wherein the analytic information provides an indication of how many different users are using a particular dynamic call.

18. The system of claim 13, wherein the analytic information provides an indication of geographic distribution of users causing a particular dynamic call to be called.

19. A computer program product comprising a computer storage device containing computer-executable instructions for a computer-implemented method of producing analytic information based on monitoring dynamic calls executed at one or more pages of a dynamic web application, and wherein the computer-implemented method comprises:
  providing for at least one page of a dynamic web application a code segment indicating that one or more pages of the dynamic web application are to be monitored for dynamic calls executed by the one or more pages;
  in response to the code segment provided at the at least one page, downloading additional code for custom methods configured to gather statistics information based on the dynamic calls when executed at the one or more pages of the dynamic web application;
  intercepting one or more native methods responsible for performing the dynamic calls at the one or more pages of the dynamic web application;
  in response to the intercepting of the one or more native methods, substituting the native methods in the dynamic web application with the custom methods configured to gather statistics information based on the dynamic calls when executed;
  using the custom methods to gather statistics information based on one or more dynamic calls executed at the dynamic web application; and
  providing any statistics information gathered to an analytics engine for analysis.

20. The computer program product of claim 19, wherein the statistics information gathered is gathered on a per dynamic call basis and not on a per page visit basis.

* * * * *